United States Patent [19]

Hanson

[11] Patent Number: 4,926,689
[45] Date of Patent: May 22, 1990

[54] PROOFMASS SUSPENSION ASSEMBLY FOR ACCELEROMETERS

[76] Inventor: Richard A. Hanson, 21220 NE. 156th Ave., Woodinville, Wash. 98072

[21] Appl. No.: 257,189

[22] Filed: Oct. 12, 1988

Related U.S. Application Data

[63] Continuation of Ser. No. 899,975, Aug. 25, 1986, abandoned.

[51] Int. Cl.$^5$ .............................................. G01P 15/08
[52] U.S. Cl. ................................... 73/497; 73/517 R; 73/517 B; 73/517 AV
[58] Field of Search .................. 73/497, 514, 517 R, 73/517 AV, 517 B; 338/5, 46

[56] References Cited

U.S. PATENT DOCUMENTS

| | | | |
|---|---|---|---|
| 4,071,838 | 1/1978 | Block | 73/517 R |
| 4,104,920 | 8/1978 | Albert et al. | 73/517 AV |
| 4,182,187 | 1/1980 | Hanson | 73/517 B |
| 4,250,757 | 2/1981 | Hanson | 73/517 B |
| 4,750,363 | 6/1988 | Norling | 73/497 |

FOREIGN PATENT DOCUMENTS

| | | | |
|---|---|---|---|
| 534694 | 1/1977 | U.S.S.R. | 73/517 R |
| 1534276 | 11/1978 | United Kingdom | 338/5 |

Primary Examiner—John Chapman
Attorney, Agent, or Firm—Flehr, Hohbach, Test, Albritton & Herbert

[57] ABSTRACT

An improved proofmass flexure suspension assembly in which the proofmass is supported by a flexure geometry which allows the proofmass to act as a pendulum tending to rotate in response to acceleration along the sensitive axis and which rejects errors caused by structural strains or loading along or about both cross axis and which further allows the use of different types of associated proofmass position detectors and sensitive axis force transducing elements. The proofmass is pendulously connected to an isolation bridge by proofmass flexures, and the isolation bridge in turn is pendulously connected to a frame by isolation bridge flexures.

20 Claims, 11 Drawing Sheets

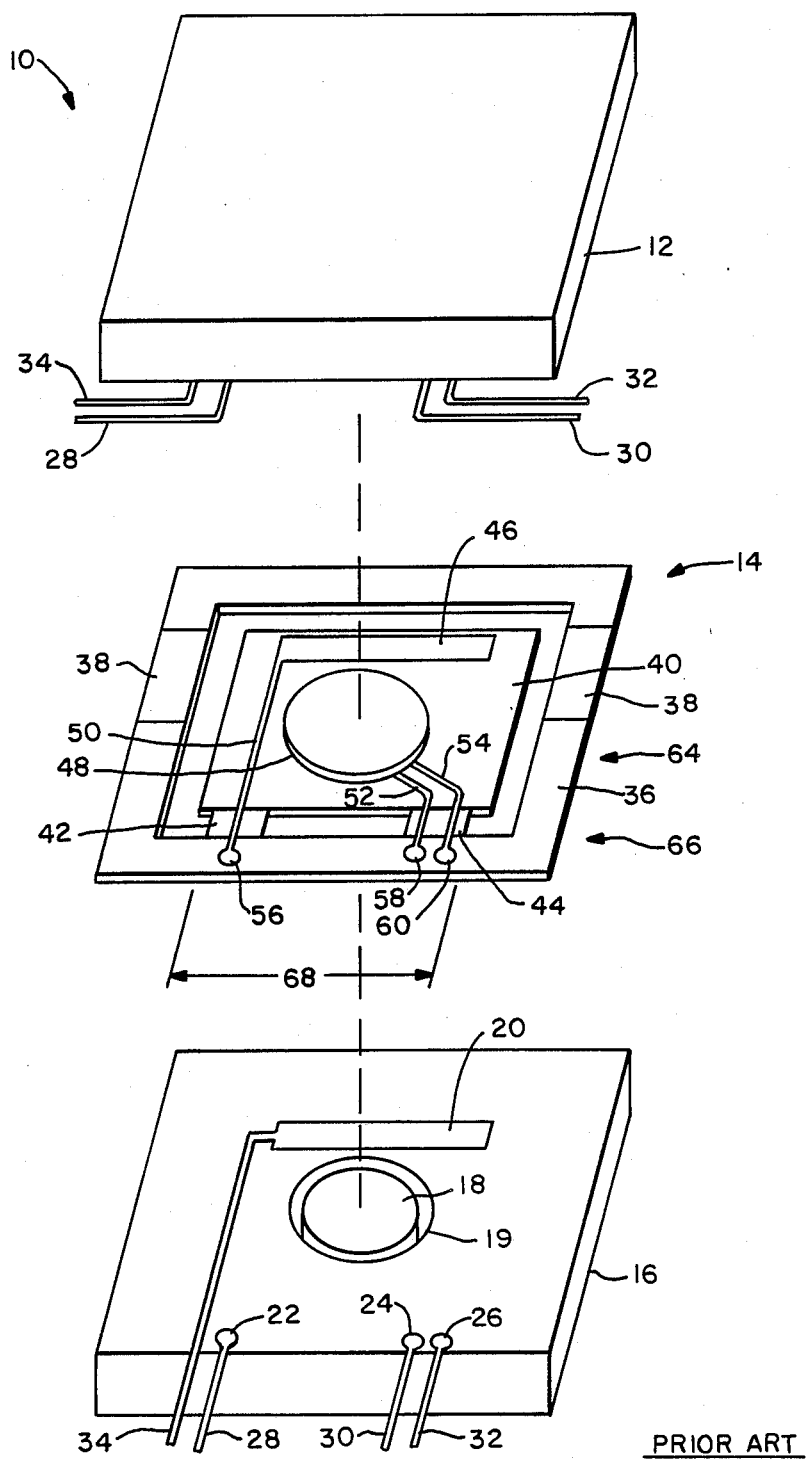
FIG.—1　PRIOR ART

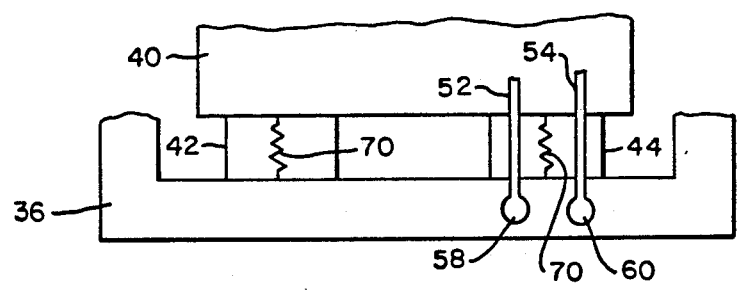
(PRIOR ART)
FIG.—2
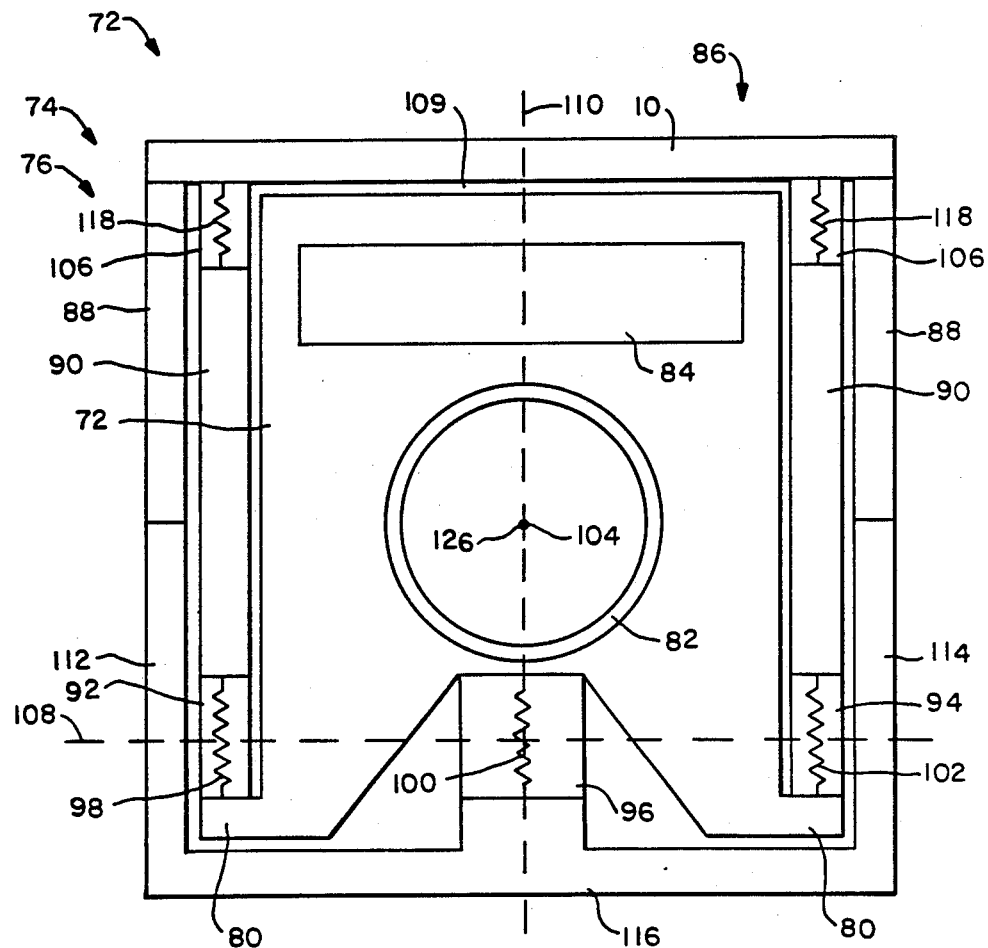
FIG.—3

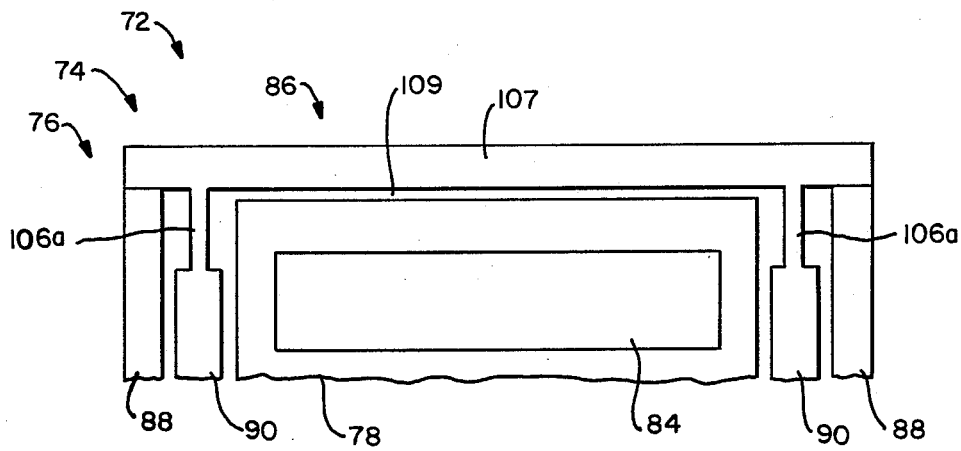
FIG.—3a
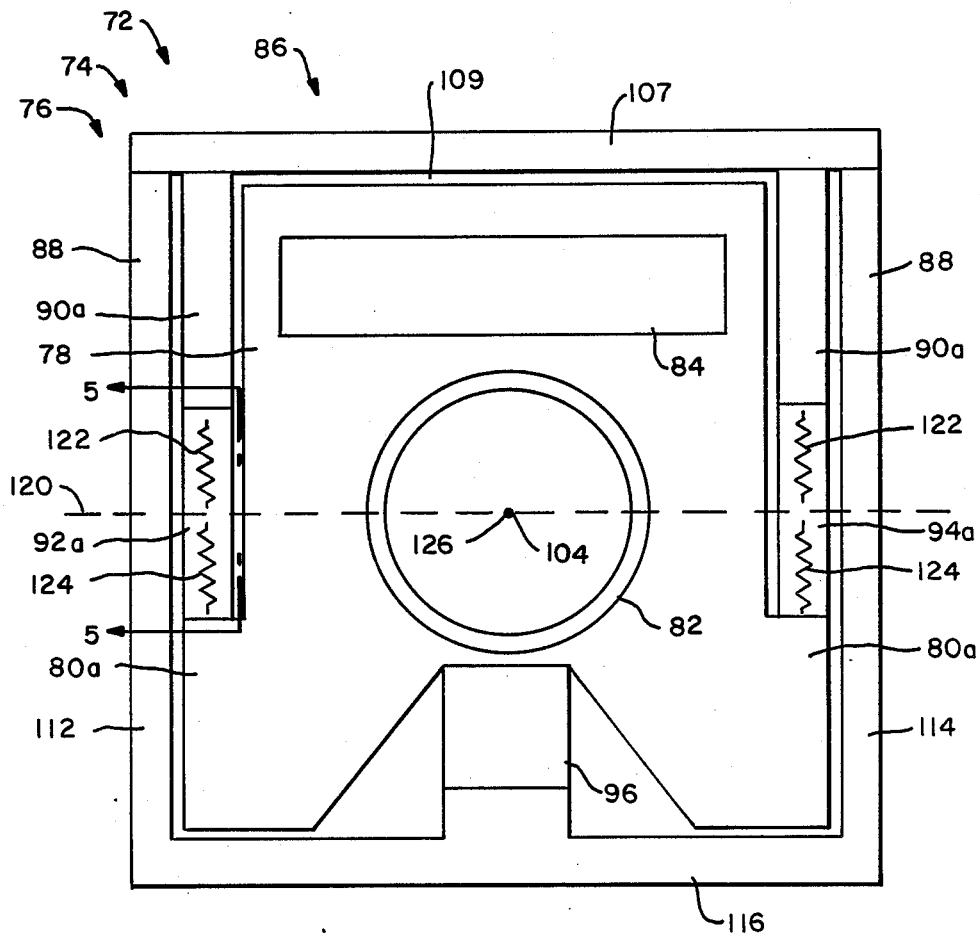
FIG.—4

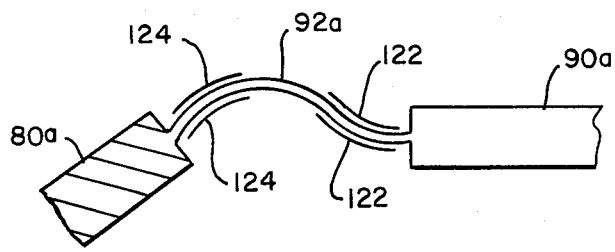
FIG.—5
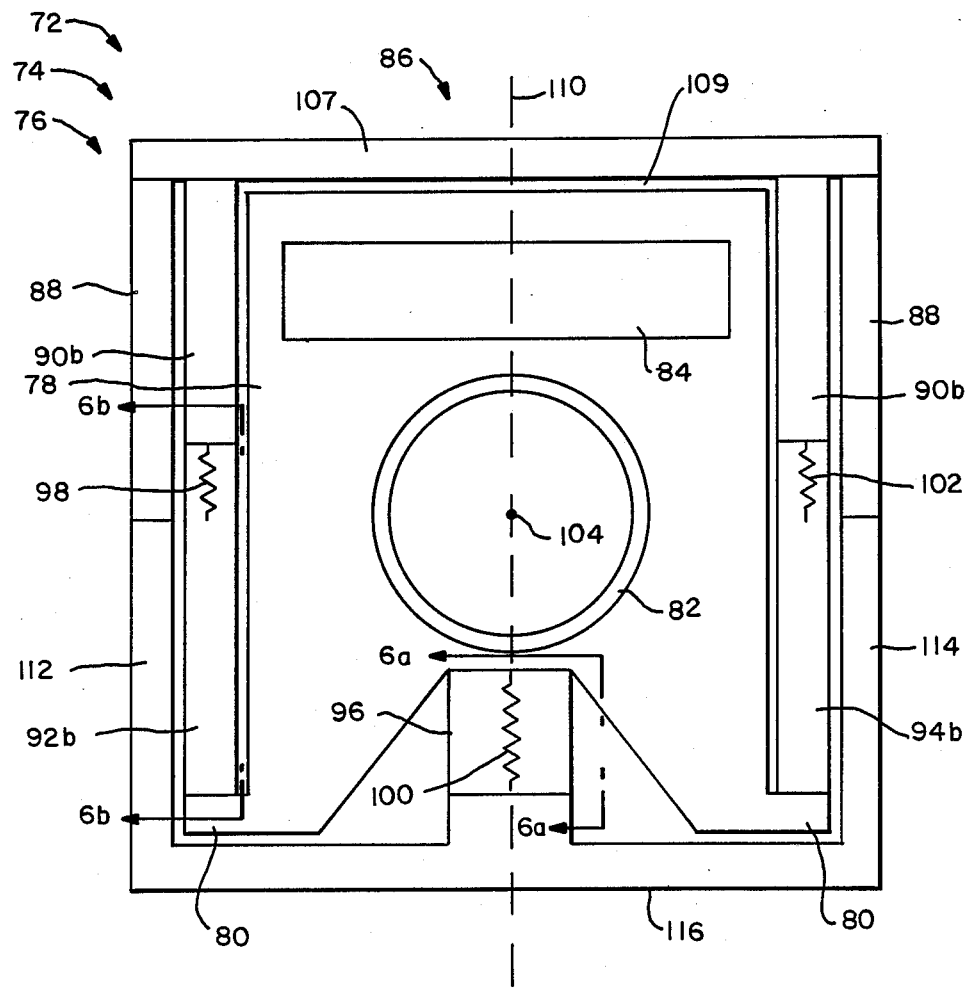
FIG.—6

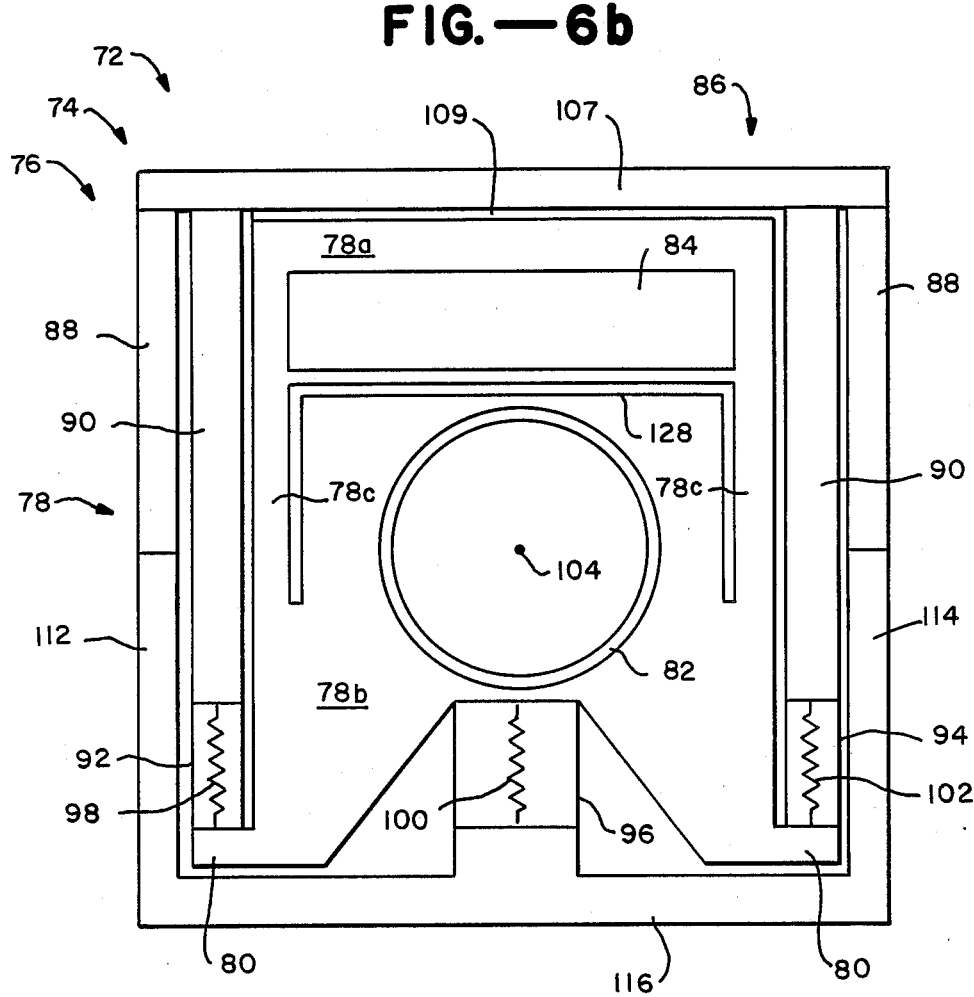
FIG.—6a
FIG.—6b
FIG.—7

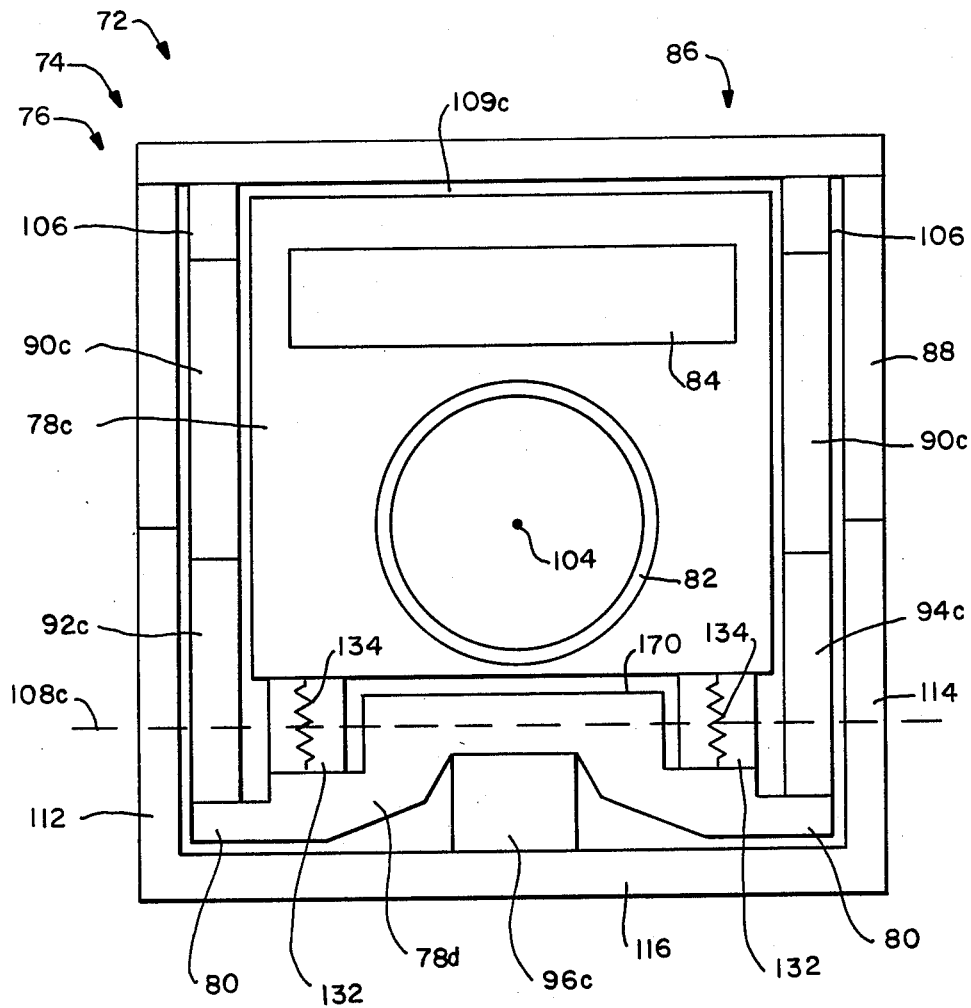
FIG.—8

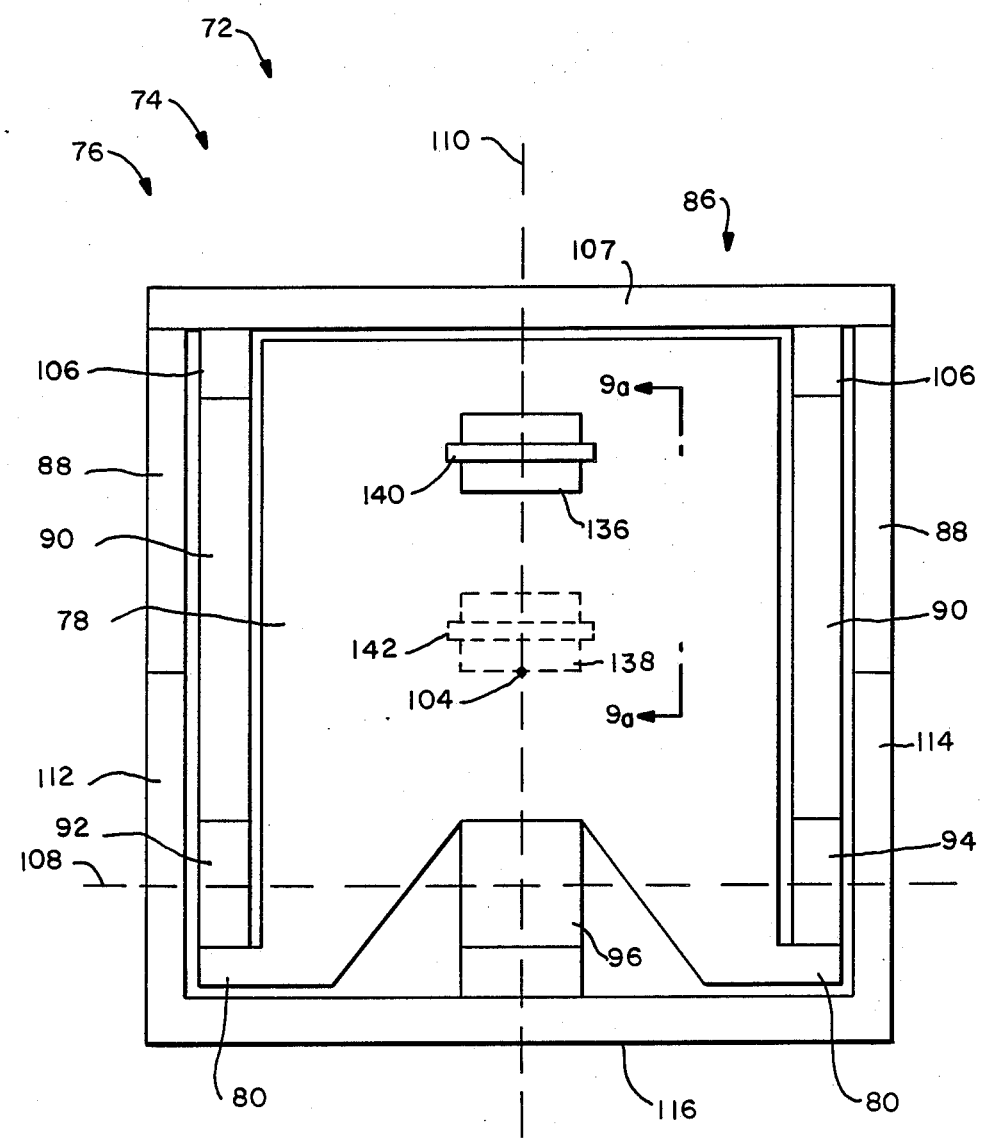
FIG.—9

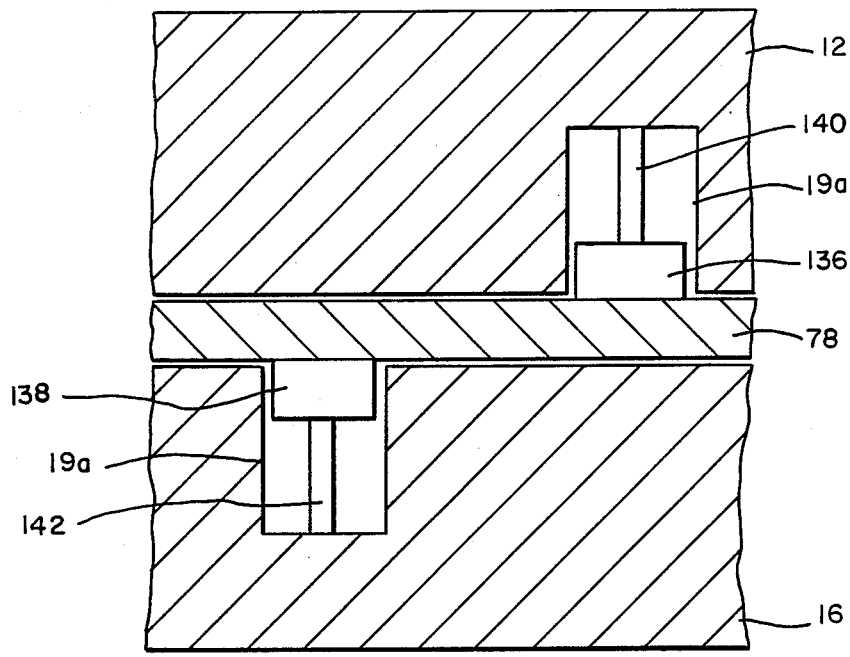
FIG.—9a
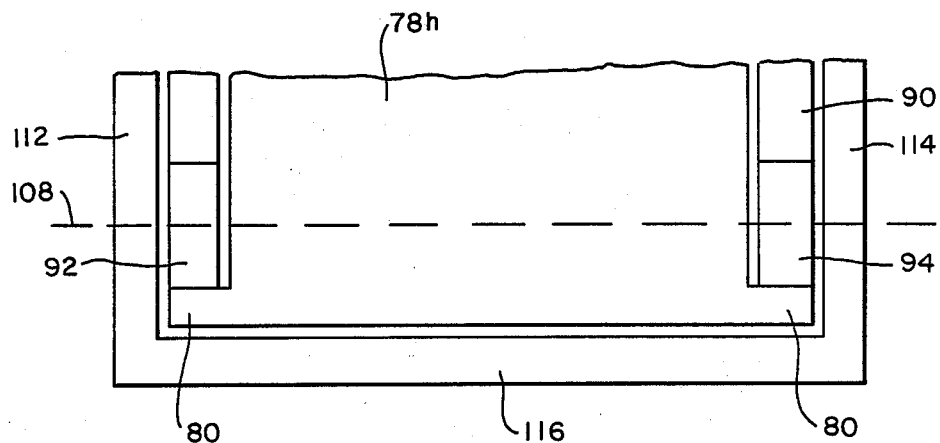
FIG.—9b

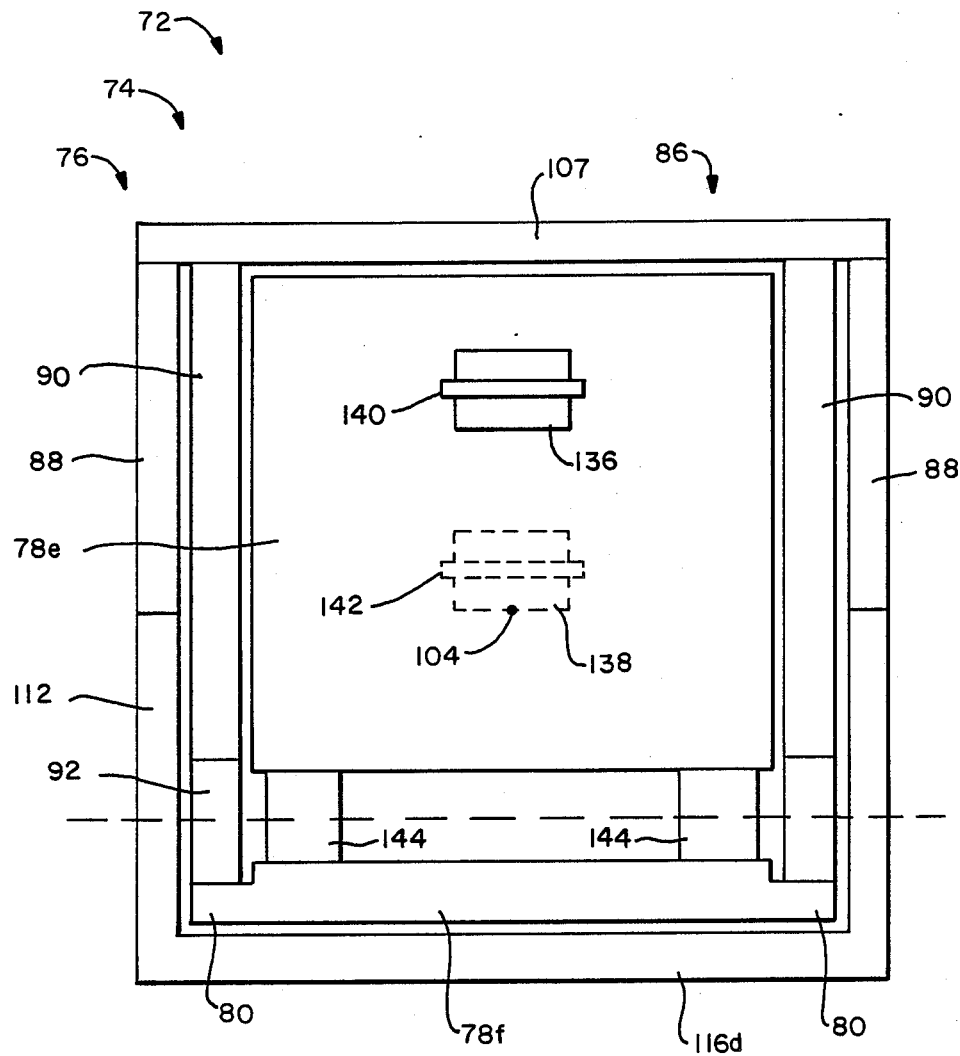
FIG.—10

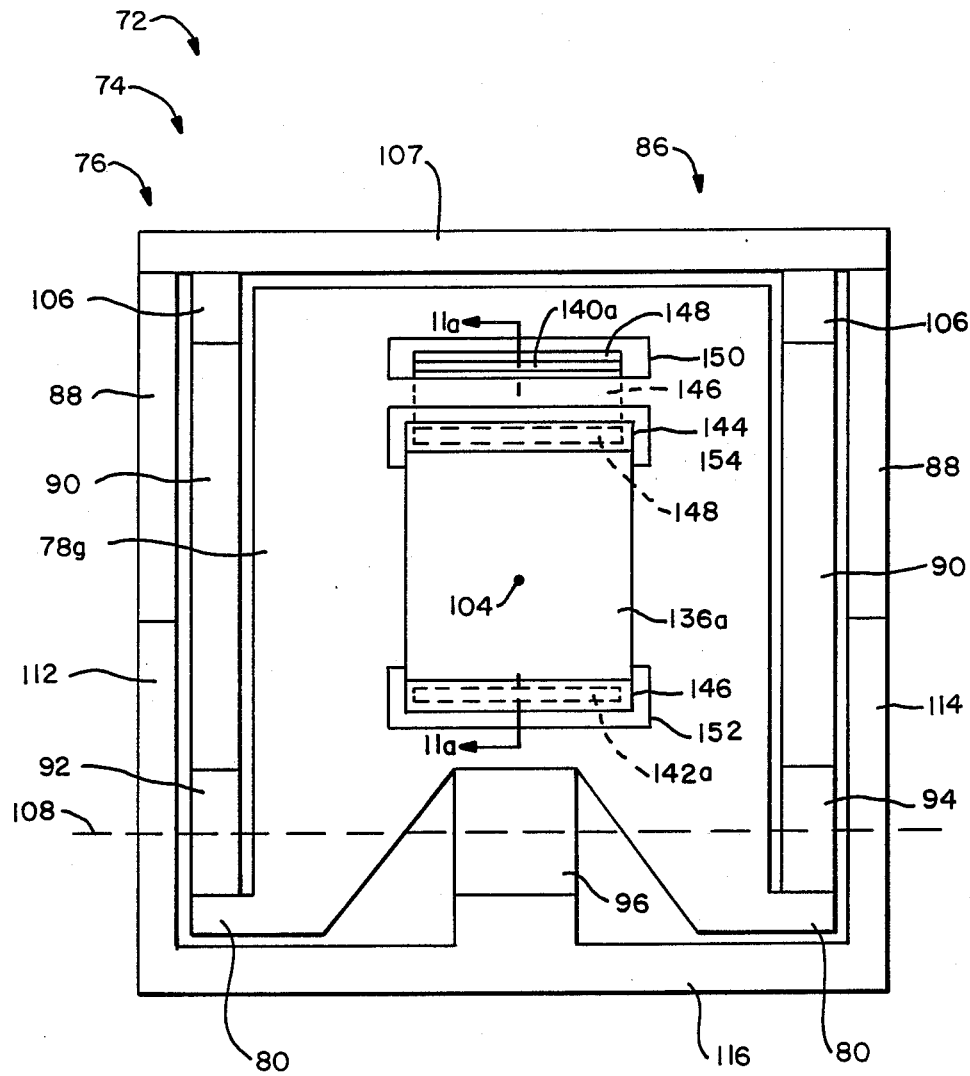
FIG.—11

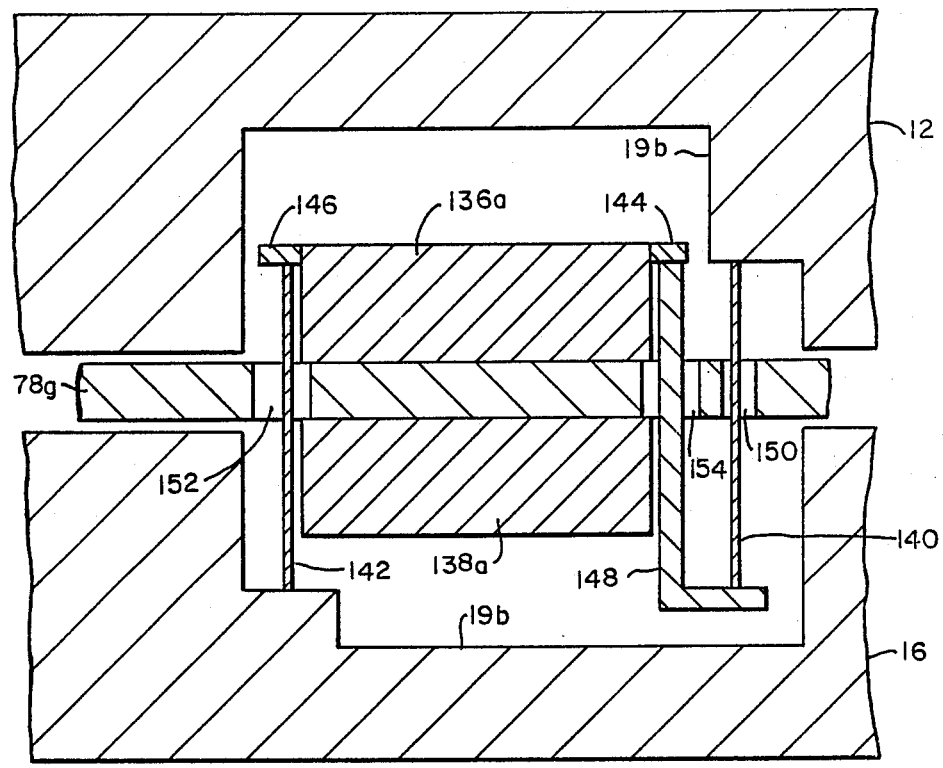
FIG.—11a

PROOFMASS SUSPENSION ASSEMBLY FOR ACCELEROMETERS

This is a continuation of application Ser. No. 06/899,975 filed Aug. 25, 1986, abandoned.

BACKGROUND OF THE INVENTION

The present invention relates generally to the field of accelerometers. More particularly, it relates to providing an improved proofmass suspension assembly for the proofmass in an accelerometer.

SUMMARY OF THE INVENTION

Existing proofmass suspension assemblies suffer from several problems. Among them are that their flexures are susceptible to stresses and strains which tend to cause them to buckle. Such stresses and strains are very undesireable because they may cause erroneous measurement outputs (bias errors) and because they may even lead to the complete failure (breakage) of one or more of the flexures. Such stresses and strains may be caused by vibration, shock, temperature gradients across the suspension assembly, flexure imperfections and microdimensional instabilities in the materials from which the suspension assembly is made.

In addition, the flexures in the prior art proofmass suspension assemblies typically carry metallization layers or strain gauges for purposes discussed fully below. However such strain gauges and metallization layers carried by the flexures may induce stress instabilities which produce moments on their flexures which, in turn, bias the proofmass to produce output errors. Sensitivity of the proofmass suspension assembly to such stress instabilities is particularly undesireable since these stress instabilities are usually unpredictable as to magnitude and time of occurance, and are thus very difficult, if not impossible, to correct for by computer modeling or by the sensing electronics which provide the output measuring signal.

Accordingly, one of the primary objects of the present invention is to provide improved proofmass suspension assemblies which tend to minimize these and other problems of the prior art proofmass suspension assemblies.

The foregoing is intended to be but a brief summary of some of the objects, features, advantages and characteristics of the present invention, and is not a detailed catalog thereof, since these and further objects, features, advantages and characteristics of the present invention are expressly or inherently disclosed by all of the disclosures herein.

BRIEF DESCRIPTION OF THE DRAWINGS

FIG. 1 is a schematic exploded perspective view of a typical prior art accelerometer having a bifilar proofmass suspension assembly;

FIG. 2 is a schematic top elevation view of the dual flexures thereof;

FIG. 3 is a schematic top elevation view of a first form of the proofmass suspension assembly of the present invention;

FIG. 4 is a schematic top elevation view of another embodiment thereof;

FIG. 5 is a cross-sectional view taken along line 5-5 of FIG. 4;

FIG. 6 is a schematic top elevation view of another embodiment of the present invention;

FIGS. 6a and 6b are cross-sectional views taken along lines 6a-6a and 6b-6b of FIG. 6, respectively;

FIGS. 7-9 are schematic top elevation views of three more embodiments of the present invention;

FIG. 9a is a cross-sectional view taken along line 9a-9a of FIG. 9;

FIGS. 9b, 10 and 11 are schematic top elevation views of three more embodiments of the present invention; and FIG. 11a is a cross-sectional view taken along line 11a-11a of FIG. 11.

DESCRIPTION OF THE PREFERRED EMBODIMENTS

Referring now to FIG. 1, a typical conventional prior art accelerometer 10 is schematically illustrated. The accelerometer 10 includes an upper magnet structure 12, a proofmass assembly 14 and a lower magnet structure 16.

The upper and lower magnet structures 12, 16 are identical and each includes a torque coil magnet 18, a capacitive pickoff plate 20, terminals 22, 24, 26, and associated wires 28, 30, 32, 34.

The proofmass assembly 14 comprises a support frame 36; mounting pads 38 on the top and bottom surfaces of frame 36; a reed 40 connected to frame 36 by a pair of flexure hinge elements 42, 44; and a metallization layer capacitive pickoff plate 46 and a torque coil 48 mounted on both the top and bottom surfaces of reed 40. Pads 38 are normally thicker than frame 36 so that when accelerometer 10 is assembled, the rest of frame 36 preferably does not touch the upper and lower magnet structures 12, 16.

Metallization layer leads 50 and 52, 54 on top and bottom surfaces of reed 40 and flexures 42, 44 provide electrical connections to capacitive pick off plates 46 and torque coils 48, respectively. Leads 50 and 52, 54 terminate in terminals 56 and 58, 60, respectively on the top and bottom surfaces of frame 36 which mate, respectively, with terminals 22 and 24, 26 on upper and lower magnet structures 12, 16 when accelerometer 10 is assembled by sandwiching proofmass assembly 14 between upper and lower magnet structures 12, 16. Reed 40, flexures 42, 44 and frame 36 are preferably formed as one piece from fused quartz.

The conventional details of design of accelerometer 10, such as, by way of non-limiting example, damping surfaces or shock limiting stops, are not shown in either the prior art accelerometer 10, nor in the embodiments of the present invention which will be addressed below, in order to better focus on the pertinent elements of the present invention.

By way of terminology, proofmass 64 comprises reed 40 and all other elements carried by reed 40, such as capacitive pickoff plates 46, torque coils 48, and leads 50, 52, 54. Proofmass suspension assembly 66 is what supports proofmass 64, namely frame 36 and flexures 42, 44. The flexure span 68 is the distance between the left side of left flexure 42 and the right side of right flexure 44.

In operation, any acceleration of frame 36 having a component along the accelerometer 10's sensitive axis 62 (which is normal to the plane of frame 36) will cause proofmass 64 to angularly deflect on its flexures 42, 44 either up or down with respect to frame 36, depending on the direction of such an acceleration. Such deflection of proofmass 64 causes capacitive pickoff plates 20, 46 to provide a signal to sensing electronics (not illustrated) via wires 28, 34. The sensing electronics then, in turn, provide an appropriate restoring current to torque coils 48 via wires 30, 32 to return proofmass 64 to its undeflected position with respect to frame 36. The amount of such restoring current provides a measure of the sensed acceleration, after calibration of the accelerometer 10 and its associated sensing electronics.

Alternatively, as seen in FIG. 2, capacitive pickoff plates 20, 46 and their associated leads, terminals and wires 50, 56, 22, 28, 34, could be eliminated and replaced by strain gauges 70 mounted on the top and/or bottom surfaces of flexures 42, 44 for sensing accelerations of frame 36 having a component along sensitive axis 62. As before, such accelerations cause proofmass 64 to deflect up or down with respect to frame 36, causing flexures 42, 44 to bend accordingly. Such bending of flexures 42, 44 causes strain gauges 70 mounted thereon to also bend, thereby varying their resistance. Such resistance variations are detected by sensing electronics (not illustrated) which provide an appropriate restoring current to torque coils 48 via wires 30, 32 to return proofmass 64 to its undeflected position and to provide a measure of the sensed acceleration, as before. The leads, terminals and wiring for connecting the strain gauges 70 to the upper and lower magnet structures 12, 16 and to the sensing electronics is entirely conventional, and so are not illustrated, for clarity.

Referring now to FIG. 3, it illustrates a proofmass assembly 72 which includes a first form of the proofmass suspension assembly 74 of the present invention for proofmass 76.

Proofmass 76 is analogous to proofmass 64 and comprises reed 78 (which includes reed extensions 80) and everything carried by reed 78 such as top and bottom torque coils 82 and top and bottom capacitive pickoff plates 84.

Proofmass suspension assembly 74 comprises that which supports proofmass 76, namely frame 86 (which includes mounting pads 88 and frame arms 90), lower flexures 92, 94 and center flexure 96. Strain gauges 98, 100, 102 are carried on the tops and bottoms of flexures 92, 94, 96, respectively. Optional upper flexures 106 may be used to connect frame arms 90 to frame 86 to further improve the strain isolation of flexures 98, 100, 102. If upper flexures 106 are not used, then frame arms 90 connect directly to frame 86.

Frame 86, frame arms 90, flexures 92, 94, 96, 106, reed extensions 80 and reed 78 are preferably formed as one piece from fused quartz. All flexures are quite thin such as, for example, 1/30th as thick as frame 86 which, by way of non-limiting example, may be only 0.03 inches thick.

Also by way of non-limiting example, flexures 92, 94, 96 are 0.100 inches long, frame arms 112, 114 are 0.050 inches wide, top frame portion 107 and pads 88 are each 0.030 inches wide, center flexure 96 is 0.100 inches wide, flexures 92, 94, and 96 are 0.001 inches thick, and slot 109 which separates reed 78 from frame 86 is 0.010 inches wide.

In general, flexures 106 are preferably thicker than flexures 92, 94, 96 to help prevent frame arms 90 from resonating in the operation frequency range of accelerometer 10. Among the critical dimensions of proofmass assembly 72 are the thickness and width of flexures 92, 94, 96, 106, which are preferably configured to provide a low compliance along sensitive axis 104 in the presence of loading in the plane of flexures 92, 94, 96, 106, while still keeping the resonant frequencies of proofmass assembly 72 above the operational frequency range of accelerometer 10.

Proofmass assembly 72 comprises proofmass 76 and proofmass suspension assembly 74. Proofmass assembly 72 of the present invention replaces prior art proofmass assembly 14 in the prior art accelerometer 10 seen in FIG. 1. The leads, terminals and wiring necessary to connect torque coils 82, capacitive pickoff plates 84 and strain gauges 98, 100, 102 to the upper and lower magnet structures 12, 16, and to the sensing electronics, are not illustrated for clarity since they are entirely conventional.

Proofmass assembly 72 has a sensitive axis 104 which is normal to the plane of frame 86.

The torque coils 82, capacitive pickoff plates 84 and strain gauges 98, 100, 102 operate in the manner described for the FIG. 1 accelerometer 10 to detect accelerations having a component along sensitive axis 104. As in prior art proofmass assembly 14, the capacitive pickoff plates 84 are not used if strain gauges 98 are used, and vice versa.

It is noted in FIG. 3 that center flexure 94 and lower flexures 92, 94 are connected to opposite sides of frame 86; which mean they provide support for proofmass 76 from opposite directions. In addition, hinge axis 108 passes approximately through the centers of flexures 92, 94, 96; while pendulum axis 110 bisects proofmass 76 and center flexure 96.

The proofmass suspension assembly 72 illustrated in FIG. 3 offers several valuable advantages.

First, since center flexure 96 and lower flexures 92, 94 are supported from opposite sides of frame 86, i.e. from opposite directions, buckling of all three flexures 92, 94, 96 caused by cross axis accelerations of frame 86, that is accelerations having a component in any direction in the plane of frame 86, is significantly reduced. Such cross axis accelerations may be caused by vibration or by shock, and the undesireable effects of such buckling has been mentioned earlier.

That such buckling is reduced by the structure shown in FIG. 3 may be more readily appreciated by several examples. For example, if an acceleration applied to frame 86 is in the plane of frame 86 and is towards the top of the page of FIG. 3, then center flexure 96 would be under compression and would normally be expected to tend to buckle. However, since under the same acceleration conditions lower flexures 92, 94 would be under tension (because they are supported from the opposite side of frame 86), they tend to prevent the otherwise expected buckling of center flexure 96 by preventing reed 78 from moving toward center flexure 96.

To take another example, if an acceleration applied to frame 86 is in the plane of frame 86 and is towards the right side of the page of FIG. 3, then the tension on left lower flexure 92 tends to prevent any buckling of right lower flexure 94 (which is under compression and would otherwise tend to buckle under such circumstances). Similarly, the tension on the portion of center flexure 96 which is on the right side of pendulum axis 110 tends to prevent any significant buckling of the portion of center flexure 96 which is on the left side of pendulum axis 110 (which is under compression and would otherwise tend to buckle under such circumstances). Naturally the tension on the left lower flexure 92 also tends to prevent buckling of the portion of center flexure 96 on the left side of pendulum axis 110; and the tension on the portion of center flexure 96 on the right side of pendulum axis 110 also tends to prevent buckling of right lower flexure 94.

Another advantage of the proofmass suspension assembly 74 illustrated in FIG. 3 is that the long frame arms 90 themselves act to reduce the buckling strain on lower flexures 92, 94 when frame 86 experiences an acceleration in the plane of frame 86 having a component normal to the longitudinal axes of arms 90, or when frame 86 experiences a strain in the plane of frame 86 caused by thermal expansion mismatches or microscopic slippage between proofmass assembly 72 and magnet structures 12, 16, or caused by material dimensional instabilities of any part of accelerometer 10. This is because for any given loading of frame 86 due to such an acceleration or such dimensional strain, the angular displacements of the upper ends of frame arms 90 with respect to their flexures 92, 94 are relatively small when frame arms 90 are longer, and become relatively large when frame arms 90 are shorter. It is apparent then that longer frame arms 90 (such as illustrated in FIG. 3) tend to cause less angular distortion or buckling of their flexures 92, 94 than if frame arms 90 were shorter than illustrated.

Another advantage of the proofmass suspension assembly 74 illustrated in FIG. 3 is best understood when considering a situation in which frame 86 is experiencing an acceleration having a component along sensitive axis 104 of accelerometer 10. For example, if the acceleration of frame 86 is up with respect to the plane of the page of FIG. 3, then center flexure 96 is bent so its convex side is up, while lower flexures 92, 94 are bent so their convex sides are down, because lower flexures 92, 94 and center flexure 96 are supported from opposite sides of frame 86. This simple bending of flexures 92, 94, 96 occurs when, as illustrated in FIG. 3, the axes about which flexures 92, 94, 96 bend are all substantially aligned with hinge axis 108.

Due to the fact center flexure 96 bends in a direction that is opposite to the direction in which the lower flexures 92, 94 bend under accelerations of frame 86 which have a component along sensitive axis 104, the sensitivity of the proofmass 76 to stresses caused by any strain gauges 98, 100, 102 mounted on flexures 92, 94, 96, or to stresses caused by an electrical conductor or metallization layers on flexures 92, 94, 96 which connect the torque coil 82 or capacitive pickoff plate 84 to the sensing electronics, is desireably reduced by the present invention.

This is because if there are such metallization layers and/or strain gauges on all three flexures 92, 94, 96, then they tend to bend all three flexures 92, 94, 96 in the same direction, resulting in no movement of the proofmass 76. Thus, in such circumstances, the bending of flexures 92, 94 opposes the bending of flexure 96, resulting in the at least partial cancellation of any movement of proofmass 76 which might otherwise occur under these circumstances.

This is best understood when it is again recalled that for the proofmass 76 to move, the lower flexures 92, 94 and the center flexure 96 must bend in opposite directions.

The cancellation effect described above is optimized when the sum of the effective areas of any metallization layers and strain gauges 98, 102 on flexures 92, 94 is substantially equal to the sum of the effective areas of any metallization layers and strain gauges 100 on center flexure 96. Such a cancellation effect occurs even when there are metallization layers and strain gauges 98, 100, 102 on only one side of flexures 92, 94, 96.

It is noted that while both sides of flexures 92, 94, 96 can have metallization layers and strain gauges 98, 100, 102 as has been mentioned earlier, the proofmass suspension assembly 74 seen in FIG. 3 works satisfactorily with metallization layers and strain gauges 98, 100, 102 on only one side of its flexures 92, 94, 96, since its flexures 92, 94 and 96 bend in opposite directions when accelerometer 10 experiences an acceleration along its sensitive axis 104.

Turning now to another advantage of the proofmass suspension assembly 74 of FIG. 3, its flexure span may be considered to be the width of its center flexure 96. Note that this flexure span of the FIG. 3 device is much narrower than the flexure span 68 of the prior art proofmass suspension assembly 14 seen in FIG. 1. This is advantageous because it results in improved isolation of center flexure 96 from bending strains, caused for example by thermal expansion mismatch, having a component in the plane of the page of FIG. 3 which tend to move the tops of the left and right sides 112, 114 of frame 86 towards or away from each other. Such improved isolation is achieved because such movements of the tops of the left and right sides 112, 114 of frame 86 tend to cause the lower side 116 of frame 86 to bow up in an arc from its ends if the tops of sides 112, 114 are moved away from each other, and tend to cause the lower side 116 of frame 86 to bow down in an arc from its ends if the tops of sides 112, 114 are moved toward each other. Thus, center flexure 96 experiences less distortion under such circumstances since its flexure span is narrow, and thus spans a smaller angle of arc, as compared to the distortion experienced by flexures 42, 44 of the FIG. 1 device which has a wider flexure span 68, and whose flexure span 68 spans a wider angle of arc as compared to flexure 96.

Another advantage of the proofmass suspension assembly 74 of FIG. 3 arises from its use of two elongated and narrow mounting pads 88. These pads interface with the support elements for proofmass assembly 72, such as upper and lower magnet structures 12, 16. The importance of pad size and shape is recognized in U.S. Pat. No. 3,702,073, which teaches small nearly square spacer elements or pads spaced around the circumference. The suspension assembly of the invention described herein, has a geometry which is suitable for a square or rectangular configuration. Such a non circular configuration is best implemented with a different pad configuration. A rectangular sensor will have two primary axis through the center and parallel to the sides about which dishing strain distortion can occur. The use of two elongated and narrow mounting pads 88 reduces the sensitivity of the proofmass assembly 72 to dishing type strains in the upper and lower support elements 12, 16, which would otherwise cause bias errors. Such dishing is inevitable to some degree due to thermal expansion mismatches, thermal gradients, or dimensional instabilities. In addition, the suspension of proofmass 76 from flexures 92, 94, 96 which are connected to proofmass 76 from opposite directions also reduces the sensitivity of proofmass assembly 72 to dishing of the upper and lower support elements 12, 16 about an axis parallel to hinge axis 108 since the direction of the moments of flexures 92, 94, 96 on proofmass 76 are in opposite directions, and thus tend to cancel.

It is, of course, desireable to minimize the sensitivity of proofmass 76 of FIG. 3 to cross-axis (non-sensitive axis) accelerations of frame 86 since they are not intended to be measured and would induce measurement errors if they were detected.

It is noted that strain gauges 118 could be provided on upper flexures 106, as seen in FIG. 3, instead of providing strain gauges 98, 102 on lower flexures 92. Strain gauges 118 could then be used in conjunction with strain gauge 100 on center flexure 96 to detect deflections of proofmass 76 caused by accelerations of proofmass 76 having a component along sensitive axis 104, while being unresponsive to cross-axis accelerations. In such case, the sensing electronics might be configured with a bridge circuit, to provide a restoring current to torque coils 82 when the sum of the resistances of strain gauges 100, 118 changes from that existing when proofmass 76 is undeflected.

Thus, during accelerations of frame 86 along sensitive axis 104, the resistances of strain gauges 118 on upper flexures 106 change very little since long frame arms 90 deamplify the strain on flexures 106 and their strain gauges 118. Therefore, the change of the resistance of strain gauge 100 on center flexure 96 provides a signal proportional to the angular deflection of proofmass 76. But for cross-axis accelerations, strain gauges 118 on upper flexures 106 change resistance in the opposite sign from strain gauge 100 on center flexure 96, since they go into compression when center flexure 96 goes into tension and vice versa. So for cross-axis accelerations there is little or no change in the sum of the resistances of strain gauges 100, 118, and thus the sensing electronics desireably produce little or no error signal.

Referring now to FIG. 3a, another embodiment of the proofmass suspension assembly 74 of the present invention is illustrated which is the same as that illustrated in FIG. 3 except that upper flexures 106 of FIG. 3 have been replaced by upper flexures 106a of FIG. 3a. As seen, flexures 106a are narrower than frame arms 90, and may also be thinner than frame arms 90. The purpose of flexures 106a is to provide at least some additional degree of isolation of lower flexures 92, 94 from strains or accelerations applied to frame 86 which would tend to make the horizontal top portion 107 of frame 86 move left or right.

FIG. 4 illustrates another embodiment of the proofmass suspension assembly 74 of the present invention which is the same as that illustrated in FIG. 3, except for the changes which will now be discussed. In the FIG. 4 embodiment, upper flexures 106 have been eliminated, lower flexures 92, 94 have been moved upward to become flexures 92a, 94a, frame arms 90 have been shortened to become frame arms 90a, and reed extensions 80 have been elongated to become reed extensions 80a. Flexures 92a, 94a are longitudinally centered on a horizontal line 120 which passes through the center of gravity 126 of proofmass 76. Each flexure 92a, 94a carries upper and lower strain gauges 122, 124 on its top and bottom surfaces. Strain gauges 122, 124 are arranged near horizontal line 120, as seen.

As before, if an acceleration is applied to frame 86 of the FIG. 4 embodiment along its sensitive axis 104, its proofmass 76 will deflect up or down on its flexures 92a, 94a, 96 with respect to frame 86. If such an acceleration is down with respect to the plane of the page of FIG. 4, proofmass 76 will deflect and bend its flexures 92a, 94a into substantially an S shape as seen in FIG. 5 since they are no longer in line with flexure 96. In FIG. 5 such bending is exaggerated for illustrative purposes. During such S-bending of flexures 92a, 94a, and considering the strain gauges 122, 124 on top of flexure 92a, it will be appreciated that with proper placement of strain gauges 122, 124, as seen in FIG. 5, strain gauge 124 is in tension while strain gauge 122 is in compression. On the other hand, if strain gauges 122, 124 are also optionally on the bottom of flexure 92a, strain gauge 124 is in compression while strain gauge 122 is in tension. Thus, it is noted that the resistances of strain gauges 122, 124 change in the opposite sign, with one increasing and one decreasing, regardless of whether the top strain gauges 122, 124 or the optional bottom strain gauges 122, 124 are being considered. Exactly the same comments apply to strain gauges 122, 124 on the top and bottom of flexure 94a.

If, on the other hand, the acceleration of frame 86 along sensitive axis 104 is reversed, the S-bending of flexures 92a, 94a is reversed, and the strain gauges just discussed which were under tension will be under compression, and vice versa.

The sensing electronics can then be configured to use the difference between the resistances of strain gauges 122, 124 as a basis for measuring the sensed acceleration.

However, during cross-axis accelerations little or no S-bending of flexures 92a, 94a occurs and so the resistances of strain gauges 122, 124 will change in the same polarity (that is, both will increase in resistance or both will decrease in resistance). As a result, the sensing electronics will detect little or no differential in the resistance between strain gauges 122, 124 resulting in the generation of little or no error signal.

FIG. 6 discloses another embodiment of the proofmass suspension assembly 74 of the present invention which is the same as that seen in FIG. 3, except for the following changes. In the FIG. 6 embodiment, upper flexures 106 have been eliminated, lower flexures 92, 94 have been lengthened to become long lower flexures 92b, 94b, frame arms 90 have been shortened to become frame arms 90b, and strain gauges 98, 102 have been moved to the upper ends of long lower flexures 92b, 94b, as seen.

In operation of the FIG. 6 embodiment, an acceleration of frame 86 along its sensitive axis 104 will cause proofmass 76 to deflect up or down on its flexures 92b, 94b, 96. For example, if frame 86 experiences an acceleration along sensitive axis 104 which urges frame 86 up with respect to the plane of the page of FIG. 6, then flexures 96 and 92b, 94b will tend to bend as seen in FIGS. 6a and 6b, respectively. Flexure 92b will, of course, bend the same as flexure 94b, so all comments regarding flexure 92b apply equally well to flexure 94b.

As seen in FIGS. 6a and 6b, due to the length of flexure 92b and the S-bending thereof, the upper end of flexure 92b bends in the same direction as flexure 96. Thus, both top strain gauges 100, 98 are in tension while both optional bottom strain gauges 100, 98 are in compression. Thus, the resistances of top strain gauges 100, 98 will both increase while the resistances of bottom strain gauges 100, 98 will both decrease as such bending occurs. If the acceleration of frame 86 along sensitive axis 104 is reversed, the bending of flexures 96, 92b will be in the opposite direction and the resistances of the top and bottom strain gauges 100, 98 will change in the opposite way.

The sensing electronics can then be arranged to use the sum of the resistances of the top strain gauges 98, 100 (or of the bottom strain gauges 98, 100, or of both pairs of top and bottom strain gauges 98, 100) on flexures 92b, 94b, 96 to provide a basis for measuring the sensed acceleration.

On the other hand, for cross-axis accelerations of frame 86 little or no bending of flexures 92b, 94b, 96 occurs, causing the resistances of strain gauges 98, 100 to change in opposite polarities and resulting in the generation of little or no error signal.

For all of the embodiments of the proofmass suspension assembly 74 disclosed herein the length of any of the flexures can be selected to permit two or more strain gauges to be carried end to end on the top or bottom surface of the flexure (as was done with strain gauges 122, 124 of FIG. 4), and to then connect the end to end strain gauges electrically in series. This option is desireable since it provides an averaging of any instability of the strain gauges, and will thus reduce any errors otherwise caused by any such instability.

Referring now to FIG. 7, another embodiment of the proofmass suspension assembly 74 of the present invention is illustrated. The embodiment of FIG. 7 is the same as that of FIG. 3, except upper flexures 106 have been eliminated, and an inverted U-shaped isolation slot 128 has been formed in reed 78 to divide reed 78 into an upper reed portion 78a and a lower reed portion 78b connected by left and right reed arms 78c.

The purpose of reed arms 78c and slot 128 is to provide strain relief for the capacitive pickoff plates 84 from the strains torque coils 82 induce in lower reed portion 78b. Such strains are due to factors such as any temperature expansion gradient across torque coils 82, and any stresses resulting from the mounting of torque coils 82. Such stresses and strains are particularly undesireable, if they are permitted to influence capacitive pickoff plates 84, because they usually vary unpredictably in magnitude and time of occurance, and are thus difficult if not impossible to predict by modeling or to correct for by the sensing electronics.

The need for such strain relief is recognized by U.S. Pat. No. 4,182,187 which resolves the problem by isolating its torque coil assembly from its flexures. In contrast, the approach herein is to instead isolate capacitive pickoff plates 84 from flexures 92, 94, 96. This new approach has the advantage of producing generally smaller alignment errors, with the potential negative effect of possibly allowing strains of torque coils 82 to warp conventional bifilar flexures, if this feature of the present invention is used with a conventional bifilar flexure suspension. The other geometries described herein solve the potential flexure warpage problem.

It is understood that any of the other embodiments of the proofmass suspension assembly 74 disclosed herein could be provided with an isolation slot 128 to divide reed 78 into upper and lower reed portions 78a and 78b which are connected by reed arms 78c for the purpose of isolating capacitive pickoff plates 84 from stresses and strains induced by torque coils 82.

Referring now to FIG. 8, another embodiment of the proofmass suspension assembly 74 of the present invention is illustrated. The embodiment of FIG. 8 is the same as that of FIG. 3, except for the following differences. Lower flexures 92, 94 have been lengthened to become side isolation flexures 92c, 94c; slot 109 has changed slightly in shape to become slot 109c; bridge arms 90 have been shortened to become bridge arms 90c; all strain gauges have been eliminated; reed 78 has been split into an upper reed portion 78c and a lower isolation bridge reed portion 78d separated by an isolation slot 130; bifilar suspension flexures 132 have been added to connect the upper and lower reed portions 78c, 78d; top and bottom strain gauges 134 are used on bifilar flexures 132; center flexure 96 has been lowered to become center isolation flexure 96c; hinge axis 108 becomes hinge axis 108c, as seen; proofmass 76 now does not include lower isolation bridge reed portion 78d; and proofmass suspension assembly 74 now also includes lower isolation bridge reed portion 78d and bifilar flexures 132.

Some of the features and advantages of the FIG. 8 embodiment are as follows. First, side isolation flexures 92c, 94c help to keep loading and strains applied to accelerometer 10 from buckling bifilar suspension flexures 132. The bifilar flexures 132 are isolated to the extent that since side isolation flexures 92c, 94c are longer and buckle and therefore absorb the strain which would otherwise buckle the bifilar flexures 132. Such longer side isolation flexures 92c, 94c would also be effective in reducing buckling sensitivity when used with other embodiments, such as shown in FIG. 3.

Second, lower isolation bridge reed portion 78d connects to center isolation flexure 96c to provide increased rigidity for proofmass 76 along hinge axis 108c. Center flexure 96c provides such increased rigidity for proofmass 76 since it is not mounted on an arm 90c as are the side isolation flexures 92c, 94c. Such increased rigidity along hinge axis 108c is needed to prevent the resonant frequency in that direction from occurring at a frequency which is within the operating frequency range of accelerometer 10.

Referring now to FIGS. 9 and 9a, another embodiment of the proofmass suspension assembly 74 of the present invention is illustrated. The embodiment of FIGS. 9, 9a is the same as that of the FIG. 3 embodiment, except for the following differences. The upper and lower magnet support structures 12, 16, their magnets 18 have been eliminated and their cavities 19 have been sized and located to become cavities 19a which, as seen in FIG. 9a, receive mass elements 136, 138 and crystals 140, 142 so the ends of crystals 140, 142 bear against their respective mass elements 136, 138 and support structures 12, 16. In turn, mass elements 136, 138 are carried by and bear against reed 78. In addition, strain gauges 98, 100, 102 and 106, capacitive pickoff plates 84 and torque coils 82 have been eliminated.

In FIGS. 9 and 9a the leads, terminals and wiring to electrically connect crystals 140, 142 to support structures 12, 16 and to the sensing electronics are entirely conventional and so are not illustrated, for clarity.

Crystals 140, 142 are used as a replacement for and serve the same function as the combination of the previously described torque coils 82 and their associated magnets 18 in combination with their cooperating capacitive pick off and restoring electronics. That is, crystals 140, 142 in combination with these other components, act to maintain the proofmass 76 in an undeflected position with respect to frame 86. During an acceleration of frame 86 along sensitive axis 104, the restraining force exerted by crystals 140, 142 on proofmass 76 to maintain proofmass 76 in an undeflected position acts to change the vibrational frequency of crystals 140, 142. Such a change in the vibrational frequency of crystals 140, 142 is used by the sensing electronics as a measure of the sensed acceleration.

As a further modification of the FIG. 9, 9a embodiment, it is preferred that center flexure 96 be eliminated, as seen in FIG. 9b, so modified reed 78h is directly supported only by flexures 92, 94, in order to allow both angular and linear proofmass 76 freedom of motion, with a low linear motion spring rate. The embodiment of FIG. 9b is the same as that of FIG. 9, 9a, except for the change just indicated.

A low linear motion spring rate is desirable because it reduces the error signal produced in crystals 140, 142 due to thermal expansion. The elimination of center flexure 96 decreases the angular spring rate of proofmass 76, which reduces other errors induced by dimensional instabilities.

Flexures 92, 94 act to restrain proofmass 76 in the direction of pendulous axis 110. Flexures 92, 94 and arms 90 also provide most of the restraint for proofmass 76 along hinge axis 108. Either the flexures 92, 94 are stiffened to provide the necessary restraint for proofmass 76 to avoid interfering resonances, or crystals 140, 142 are selected to be used which provide the needed added restraint for proofmass 76 in addition to whatever stiffness is provided by flexures 92, 94.

As a modification of the FIG. 9, 9a embodiment, although it is preferred that mass elements 136, 138, crystals 140, 142 and cavity 19a be offset as shown, it is possible with axially compliant crystal geometries that they would be aligned directly over each other with no offset at all.

Preferably, crystals 140, 142 are in close alignment so that each provides the same amount of restraining force to proofmass 76. However, due to the rigidity of some types of crystals 140, 142 and their high degree of stiffness along their sensing axis 104, they are best offset to some degree to allow for differential thermal expansion. Center flexure 96 was removed to allow proofmass 76 to translate linearly to allow for expansion of crystals 140, 142. This removal of center flexure 96 dictates some offset of crystals 140, 142 to provide the necessary rotational stiffness of proofmass 76 about hinge axis 108. The best offset of crystals 140, 142 is determined by the stiffness of crystals 140, 142, the degree of matching of thermal expansion, the overall geometry of proofmass 76, and the stiffness of flexures 92, 94. The effects of offsetting crystals 140, 142 can easily be corrected by computer modeling.

As a further modification of the FIG. 9, 9a embodiment, mass elements 136, 138 could be eliminated and crystals 140, 142 could be lengthened to bear directly against reed 78. Mass elements 136, 138 are used where higher output scale factor is required.

Referring now to FIG. 10, another embodiment of the proofmass suspension assembly 74 of the present invention is illustrated which is the same as the FIGS. 9, 9a embodiments, except for the following differences. Upper flexures 106 and center flexure 96 have been eliminated; the bottom 116 of frame 86 has been modified as seen to become frame bottom 116d; reed 78 has been split into upper reed portion 78e and lower isolation bridge reed portion 78f; and bifilar suspension flexures 144 have been added to connect upper and lower reed portions 78e, 78f.

The same modifications outlined above for the FIGS. 9, 9a embodiment apply equally well to the FIG. 10 embodiment.

Crystals 140, 142 provide needed added rigidity along the hinge axis. A crystal 140, 142 which has a substantial dimension at right angles to its sensing axis 104 is required. The rigidity of crystals 140, 142 together with the rigidity of flexures 92, 94, 144 must keep resonant frequencies above the operational range of the accelerometer 10.

Lower flexures 92, 94 provide isolation of bifilar flexures 144 from cross-axis accelerations of frame 86 to reduce buckling of flexures 144.

Reed bridge portion 78f prevents the buckling strain of isolation flexures 92, 94 from being transferred to bifilar flexures 144, thus preventing or reducing the buckling of bifilar flexures 144 and reducing any corresponding output errors since bifilar flexures 144 will have a lower effective spring rate when they have little or no buckling.

Lower reed portion 78f and flexures 144 form part of the proofmass suspension assembly 74 and do not form part of the proofmass 76.

Referring now to FIGS. 11 and 11a, another embodiment of the proofmass suspension assembly 74 of the present invention is illustrated. The embodiment of FIGS. 11, 11a is the same as that of the FIGS. 9, 9a embodiment, except for the following differences. Mass elements 136, 138 have been changed to become mass elements 136a, 138a; crystals 140, 142 have been changed to become crystals 140a, 142a; mass element extensions 144, 146 have been mounted on mass elements 136a, 138a; an L-shaped thermal expansion corrector arm (TECA) 148 has been added; reed 78 has become reed 78g with holes 150, 152, 154 therein for crystals 140a, 142a and TECA 148, respectively; and holes 19a in the upper and lower support structures 12, 16 have been modified to become holes 19b. Proofmass 76 now includes reed 78g, mass elements 136a, 138a, mass element extensions 144, 146, crystals 140a, 142a, and TECA 148.

As seen in FIGS. 11, 11a crystal 140a is firmly sandwiched between and carried by upper support structure 12 and TECA 148; crystal 142a is firmly sandwiched between and carried by mass element extension 146 and lower support structure 16; and TECA 148 is mounted to mass element extension 144 and the lower end of crystal 140a.

TECA 148 is made from a material selected so that TECA 148 linearly expands with temperature at approximately twice the rate that crystals 140a, 142a linearly expand with temperature. As a result of this selection of material for TECA 148 and the physical geometry shown in FIGS. 11, 11a, reed 78g will linearly translate up as the temperature of accelerometer 10 increases, and will linearly translate down as the temperature of accelerometer 10 decreases. It is to be understood that selecting TECA 148 to have a linear expansion with temperature that is exactly twice the expansion of crystals 140a, 142a may not be always achieveable. In such event, the length of TECA 148 is increased if its expansion is less than that of crystals 140a, 142a, and is decreased if its expansion is greater than that of crystals 140a, 142a.

With linear translation of proofmass 76 due to expansion of crystals 140a, 142a with temperature, there will be less sensitivity to cross axis acceleration which can cause output errors, since there will be little or no rotation of the sensitive axis as there would be if crystals 140a, 142a caused rotation of proofmass 76. There will, however, be a small cross axis sensitivity due to the fact that arms 90 will no longer be in line with both flexures 106, and 92, 94.

The various modifications described earlier with respect to the embodiments of FIGS. 9, 9a apply equally well to the embodiment of FIGS. 11, 11a.

In view of the express and inherant disclosures herein, these and further modifications, adaptations and applications of the proofmass suspension assemblies 74 of the present invention will now be apparent to those skilled in the art to which the present invention pertains, within the scope of the claims appearing herein.

What is claimed is:

1. An improved pendulous type of proofmass suspension assembly for an accelerometer having a support structure, a sensitive axis, a proofmass, and sensing means including components thereof carried by said proofmass for detecting a response in said proofmass to an acceleration along said sensitive axis for indicating an acceleration of said accelerometer along said sensitive axis, wherein said proofmass suspension assembly comprises:

a frame which is mounted to said support structure;
an isolation bridge;
one or more isolation bridge flexures; and
one or more proofmass flexures;
wherein said proofmass flexures and said isolation bridge flexures are thinner than both said isolation bridge and said proofmass in a direction parallel to said sensitive axis when the proofmass is at rest, whereby to support said proofmass for pivotal movement relative to said isolation bridge;
wherein said one or more proofmass flexures connect said bridge to one side of said proofmass such that the proofmass is supported in a pendulous manner for limited back and forth movement about an axis adjacent one side of the proofmass and through a resting plane which contains the proofmass when the latter is in its resting position;
wherein said isolation bridge is pendulously connected to said frame by said one or more isolation bridge flexures for pendulous movement toward and away from said resting plane;
wherein said one or more proofmass flexures are spaced from and are not directly connected in any substantial way with said one or more isolation bridge flexures; and
wherein said isolation bridge is supported by said isolation bridge flexures and said proofmass flexures in a sufficiently compliant manner to absorb random strains in order to substantially prevent random strains in said frame and said one or more isolation bridge flexures from reaching said one or more proofmass flexures and said proofmass and thereby possibly produce substantial errors in the output of said sensing means and indicate inaccurately an acceleration of said accelerometer.

2. The proofmass suspension assembly of claim 1, wherein there are two of said isolation bridge flexures; and
wherein said frame is connected with said isolation bridge by each of said two isolation bridge flexures.

3. The proofmass suspension assembly of claim 2, wherein there are two of said proofmass flexures; and
wherein said isolation bridge is connected to each of said proofmass flexures.

4. The proofmass suspension assembly of claim 3, wherein said two isolation bridge flexures and said two proofmass flexures are all connected with said isolation bridge on the same side of said isolation bridge.

5. The proofmass suspension assembly of claim 3, wherein the assembly includes only two isolation bridge flexures and only two proofmass flexures.

6. The proofmass suspension assembly according to claim 4,
wherein said frame includes a pair of frame arms, and
wherein said two isolation bridge flexures are respectively connected directly to otherwise free ends of said frame arms.

7. The proofmass suspension assembly according to claim 5,
wherein said proofmass is generally rectangular in configuration, and
wherein said proofmass flexures are connected to said one side of said proofmass adjacent opposite corners of the proofmass, and
wherein said isolation bridge flexures are positioned on opposite sides of the two proofmass flexures.

8. The proofmass suspension assembly according to claim 1,
wherein said assembly includes only one isolation bridge.

9. The proofmass suspension assembly according to claim 1,
wherein there are two of said proofmass flexures connecting said bridge to said proofmass.

10. A proofmass suspension assembly according to claim 1,
wherein said one or more proofmass flexures are connected with one side of said one isolation bridge and wherein said one or more isolation bridge flexures are connected on an opposite side of said bridge.

11. In a force sensing device in which a pendulous type of proofmass is supported for limited back and forth pivotal movement about an axis adjacent one side of the proofmass and through a resting plane which contains the proofmass when the latter is in its resting position and in which sensing means including components thereof carried by said proofmass are used for detecting a response of said proofmass to a force on said device along a sensitive axis normal to said resting plane and for indicating the magnitude of said force, the improvement comprising a proofmass suspension assembly for supporting said proofmass along one side thereof, said assembly including a frame which is mounted to a cooperating support structure forming part of said force sensing device,
an isolation bridge,
an isolation bridge flexure means connecting said isolation bridge to said frame, said isolation bridge flexure means being thinner in a direction normal to said resting plane than both said isolation bridge and frame, whereby to support said isolation bridge for movement relative to said frame in directions toward and away from said resting plane, and
proofmass flexure means spaced from and not directly connected, in any substantial way, with said isolation bridge flexure means and serving to connect said isolation bridge to said proofmass, said proofmass flexure means being thinner than both said isolation bridge and said proofmass in a direction normal to said resting plane, whereby to support said proofmass for said back and forth pivotal movement relative to said isolation bridge,
said isolation bridge being supported by said isolation bridge flexure means and said proofmass flexure means in a sufficiently compliant manner to absorb random strains in order to substantially prevent random strains in said frame and said isolation bridge flexure means from reaching said proofmass flexure means and said proofmass and thereby possibly produce errors in the operation of said sensing means and indicate inaccurately the magnitude of said force.

12. An improvement according to claim 11 wherein said isolation bridge flexure means includes two separate isolation bridge flexures.

13. The improvement according to claim 11 wherein said proofmass flexure means includes two proofmass flexures.

14. The improvement according to claim 11 wherein said proofmass suspension assembly includes only one isolation bridge.

15. The improvement according to claim 11 wherein said isolation flexure means consists of two isolation flexures, wherein said proofmass flexure means consists of two proofmass flexures, and wherein all four of said flexures are connected to the same side of said isolation bridge.

16. A pendulous assembly for use in device including means for sensing forces acting on the assembly in a particular direction and for determining the magnitude of those forces, said assembly comprising:
   (a) a proofmass supporting specific components of said sensing means; and
   (b) means supporting one end of said proofmass including said specific components of said sensing means for pivotal movement about a given axis back and forth in said particular direction through a resting plane which contains said proofmass in the absence of any of said sensing forces when the proofmass is at rest, said supporting means including a frame, an isolation bridge, isolation bridge flexure means for connecting said isolation bridge to a section of said frame for pivotal movement of said isolation bridge back and forth about said given axis, and proofmass flexure means being separate from and substantially unconnected with said isolation bridge flexure means for connecting said proofmass to said isolation bridge means for pivotal movement of said proofmass back and forth about said given axis, said proofmass flexure means and said isolation bridge flexure means being thinner than both said isolation bridge and said proofmass in a direction normal to said resting plane when the proofmass is at rest, whereby to support said proofmass for pivotal movement relative to said isolation bridge, said isolation bridge being supported by said isolation bridge flexure means and said proofmass flexure means in a sufficiently compliant manner to absorb random strains in order to prevent any random strains in said frame and said isolation bridge flexure means from reaching said proofmass flexure means and said proofmass and thereby possibly produce substantial errors in the operation of said sensing means.

17. An assembly according to claim 16 wherein both the isolation bridge flexure means and the proofmass flexure means are connected to one side of said isolation bridge such that the other side thereof is free-floating.

18. An assembly according to claim 16 wherein said isolation bridge flexure means is connected to one side of said isolation bridge means and wherein said proofmass flexure means is connected to the opposite side of said isolation bridge.

19. An assembly according to claim 16 wherein said proofmass flexure means and said isolation bridge flexure means are planar in configuration and extend entirely in said resting plane when said proofmass is at rest.

20. An improved type of proofmass suspension assembly for an accelerometer having a support structure, a sensitive axis, a proofmass, and sensing means including components thereof carried by said proofmass for detecting a response of said proofmass to an acceleration along said sensitive axis for indicating an acceleration of said accelerometer along said sensitive axis such that random strains in said proofmass might possibly produce substantial errors in the operation of said sensing means by causing random movement of the proofmass and thereby possibly cause inaccuracies in the acceleration output of said accelerometer, whereby said proofmass suspension assembly comprises:
   a frame which is mounted to said support structure and which can be subjected to random strains without producing substantial errors in the operation of said sensing means so long as those strains do not reach said proofmass;
   an isolation bridge;
   one or more isolation bridge flexures which may also be subjected to random strains without producing substantial errors in the output of said sensing means so long as those strains do not reach said proofmass; and
   one or more proofmass flexures;
   wherein said frame is connected to said isolation bridge by said one or more isolation bridge flexures;
   wherein said one or more proofmass flexures connect said bridge to one side of said proofmass only, whereby to support the proofmass in a pendulous manner;
   wherein said one or more proofmass flexures are spaced from and are not directly connected in any substantial way with said one or more isolation bridge flexures; and
   wherein said isolation bridge is supported by said isolation bridge flexures and said proofmass flexures in a sufficiently compliant manner to absorb random strains in order to substantially prevent random strains in said frame and said one or more isolation bridge flexures from reaching said one or more proofmass flexures and said proofmass and thereby possibly produce substantial errors in the output of said sensing electronic means and indicate inaccurately an acceleration of said accelerometer; and
   wherein said one or more proofmass flexures and said one or more isolation bridge flexures are all connected with said isolation bridge on the same side of said bridge.

* * * * *